(No Model.) 2 Sheets—Sheet 2.
G. D. WILSON.
DEVICE FOR REMOVING DEBRIS FROM CISTERNS.
No. 493,139. Patented Mar. 7, 1893.
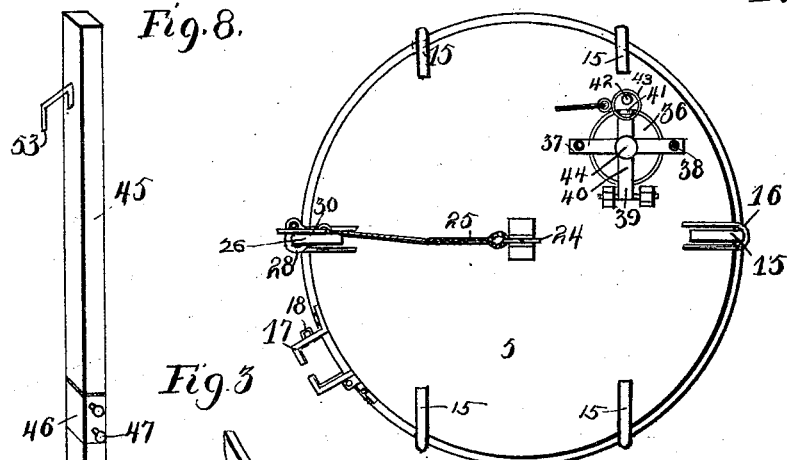
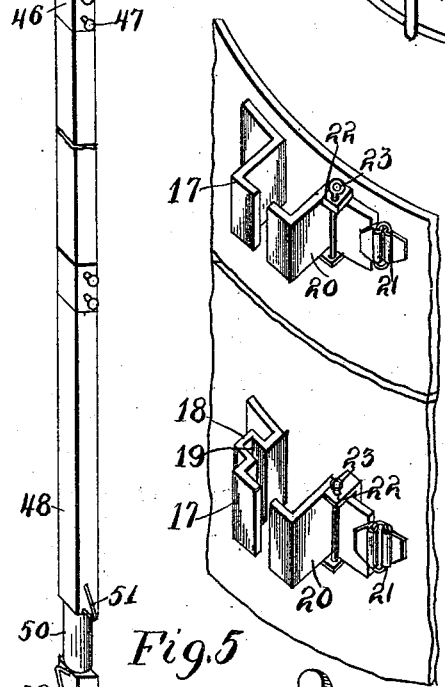
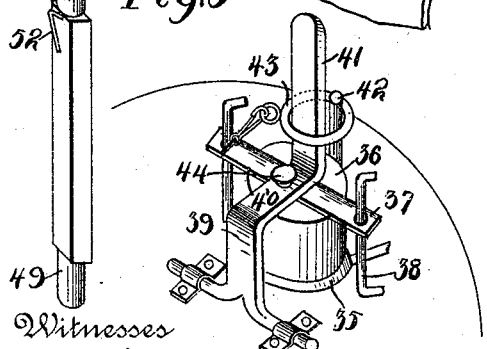
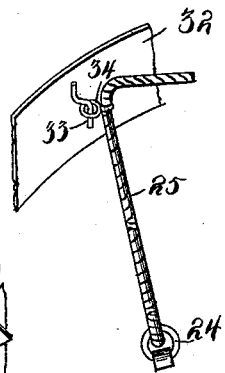
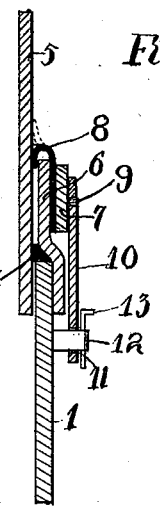
Witnesses
A. A. Eicks
Edw. E. Langan
Inventor
George D. Wilson
By his Attorneys Higdon & Higdon

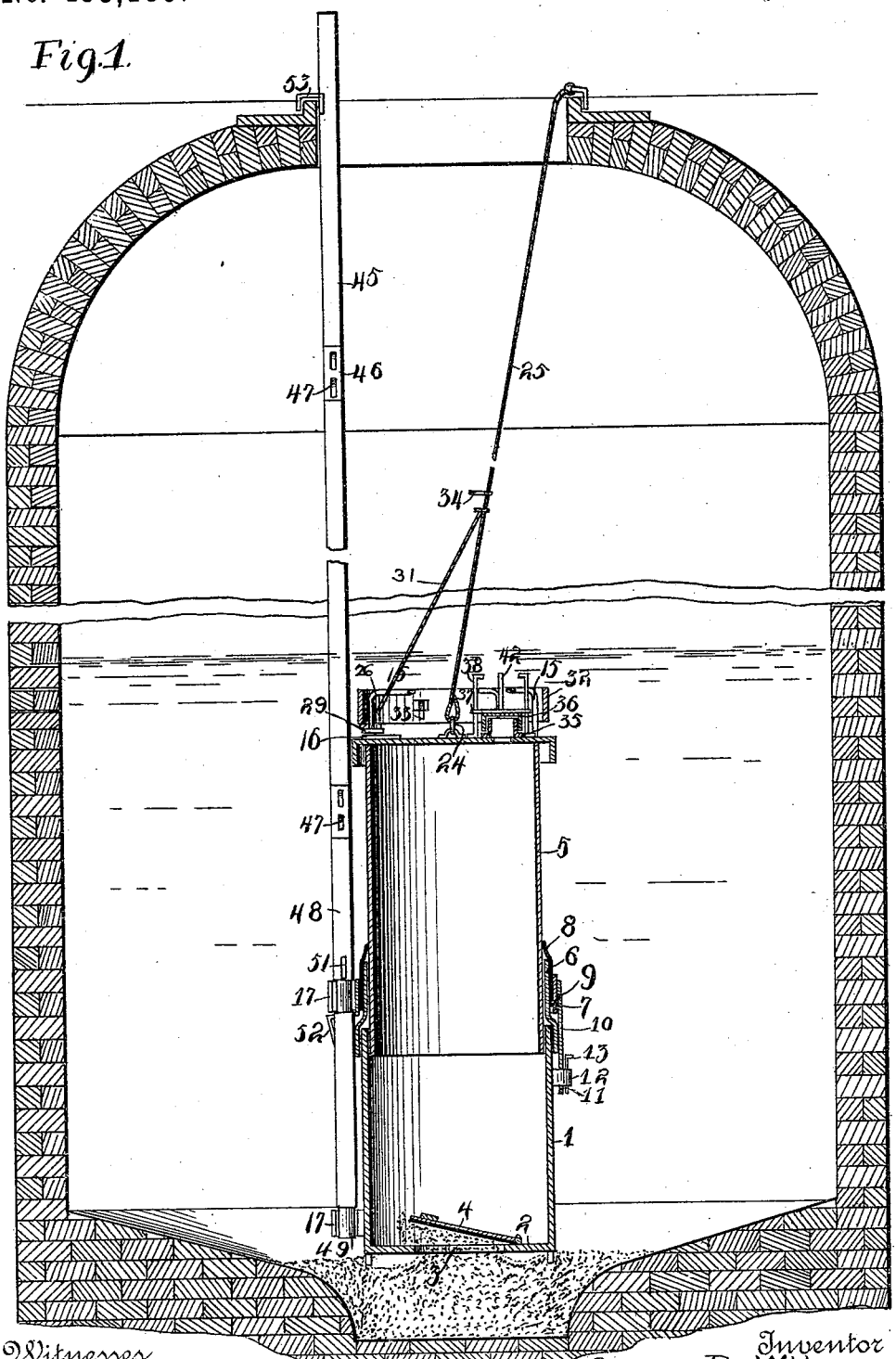

UNITED STATES PATENT OFFICE.

GEORGE D. WILSON, OF ST. LOUIS, MISSOURI.

DEVICE FOR REMOVING DÉBRIS FROM CISTERNS.

SPECIFICATION forming part of Letters Patent No. 493,139, dated March 7, 1893.

Application filed December 26, 1891. Serial No. 416,147. (No model.)

*To all whom it may concern:*

Be it known that I, GEORGE D. WILSON, of the city of St. Louis and State of Missouri, have invented certain new and useful Improvements in Devices for Removing Débris from Cisterns, of which the following is a full, clear, and exact description, reference being had to the accompanying drawings, forming a part hereof.

My invention relates to improvements in "removing débris from cisterns," and consists in the novel arrangement and combination of parts, as will be more fully hereinafter described and designated in the claims.

In the drawings:—Figure 1, is a vertical longitudinal section of my complete invention, showing its application to a cistern. Fig. 2 is a top or plan view of the device removed. Fig. 3, is a perspective view of that portion of the device to which the clips are secured. Fig. 4, is a perspective view of the releasing device which I employ in carrying out my invention. Fig. 5, is a perspective view of the releasing device for the cap, for allowing the air contained in the device to escape therefrom. Fig. 6, is a perspective view in detail showing the means for securing the operating rope to the sides of the device for lowering the same. Fig. 7, is an enlarged vertical section with parts broken away, showing the air tight connection between the two telescopic chambers, and Fig. 8, is a perspective view of the pole which I employ in carrying out my invention.

Referring to the drawings:—1, represents a chamber which is circular in cross section, and is provided with a suitable bottom 2, and said bottom is provided with an opening 3 through which the sediment contained in the cistern is adapted to pass when the device is properly operated.

4, represents a valve which is adapted to entirely cover the opening 3, and opens from the inside of the chamber 1. premising however, that said valve is hinged to the bottom of the said chamber and is adapted to move to and from the opening formed in the same.

5, represents a telescoping chamber which is somewhat smaller than the first mentioned chamber, and is adapted to move freely in the chamber 1, whereby a suction may be formed for withdrawing the sediment from the bottom of the cistern, and locating the said sediment behind the valve and within the chamber 1. The said chambers are detachable and in order to form an air tight connection and unite the same I employ the mechanism which I shall now proceed to describe.

6, represents a wide collar, the inner surface of which is preferably of the same size as the interior of the chamber 1, in order that the movable chamber 5 may freely move in said collar.

The lower edge of the collar 6 is larger than the upper portion in circumference, being so bent as to accomplish the desired formation, as best shown in Fig. 7, and around the upper portion of said collar is tightly clamped a second collar 7, premising however, that a thin sheet of rubber is placed between the two collars before the said collar 7 is firmly clamped upon the first mentioned collar, by which means the said rubber packing is firmly held in position.

The upper edge of the rubber packing 8 is adapted to come in contact with the outer surface of the movable chamber 5, under all circumstances, no matter in what direction, the said chamber 5 is moved. It will be readily understood that should air be permitted to pass between the chambers when the said upper chamber 5 is moved or elevated, it would prevent the true working of the device, namely, no suction would be formed within the chambers.

In order to secure the collars rigidly to the stationary or lower chamber 1, I provide the collars 6 with any suitable number of hinges such as 9 and to one leaf of said hinges are secured plates 10, the lower ends of which are provided with holes or apertures 11 for receiving a suitable staple 12 secured to the outer surface of the chamber 1.

13, represents a pin which is inserted into one of the staples after the plates are in the position as shown in Fig. 7 for preventing said plates from being removed.

14, represents rubber packing, which surrounds the inner circumference of the collar 6 against which the upper edge of the chamber 1 is adapted to come in contact for making a tight connection between said collar and chamber. However, I have found in practice that said packing can be dispensed with, but in order to avoid any possibility of leakage I use the same.

To the collar 6 are secured any number of vertical guide rods 15, and extend upward a sufficient distance to allow the movable chamber 5 to withdraw from a stationary chamber nearly its full length, said rods having inturned upper ends 15ª.

16, represents two staples, the prongs of which are fastened to the top of the movable chamber 5, and the loop portions of the same encircling two of the guide rods 15, said staples being oppositely arranged by means of which the said movable chamber 5 is prevented from turning, and at the same time guided on its upward movement.

Referring particularly to Fig. 3 for illustration, 17 represents clips, each of which is constructed of two sections and secured, one to the collar 7, and the other to the chamber 1. 18, represents the stationary portions of side clips, which are of angular form, the lower one however being somewhat differently constructed or shaped, namely, said stationary clip being provided with a vertical groove 19, the object of which will be hereinafter more specifically set forth. 20, represents the movable portion of the clips, which are hinged to the chamber 1 by means of hinges 21, and also secured to said chamber are perforated ears 22, which are adapted to receive pins 23 for holding the said clips or more properly the movable portions of the same in a locked position as clearly shown. To the top of the movable chamber 5 is secured a ring 24 and to said ring is secured an operating rope 25, which is of any suitable length according to the depth of the cistern.

In order to lock the two chambers in a closed position and further to release the same in order to allow the chamber 5 to move out of the chamber 1 after the device has been properly inserted into the cistern I employ the mechanism as I will now proceed to describe.

26, represents a stationary rod corresponding to the rods 15 and the lower end of which is secured rigidly to the collar 7, and also secured to said collar and in close proximity to said rod is a spring arm 27, having a bend 28 formed in the same near the upper end thereof, said bend adapted to be brought in contact with one of the staples 16, whereby the movable cylinder 5 is prevented from being withdrawn from the chamber 1, until it is desired to operate the device.

29, represents a circular plate having a perforation formed therein, and is adapted to be slid over the rod 26 and arm 27 whereby the said arm 27 is brought in a locked position upon one of the staples 16.

30, represents a triangular shaped plate, which is interposed between the rod 26 and spring arm 27, and also between the plate 29 and staple 16, as best shown in Fig. 4, by which means when strain is brought to bear or when the said triangular plate 30 is pulled, the plate 29 will be elevated and thereby release the spring arm 27 from its locked position upon the staple 16, and allow the chamber 5 to be elevated. To the upper end of the triangular plates 30 is secured a branch rope 31, which leads to and is connected to the rope 25 for operating the said plate 30 when desired.

32, represents a band which is secured to the upper end of the guide rods 15, for holding the same rigidly, and to the inner surface of said band is secured a downwardly projecting hook 33, which is adapted to be inserted into a ring 34 carried by the operating rope 25 when the device is lowered into the cistern. Should the hook end ring be dispensed with, tension would be brought to bear upon the branch rope 31, and consequently discharge the releasing device before said device is properly inserted or lowered into the cistern. Thus it will be seen that the weight of the device on being lowered, is brought to bear upon the hook 33, and after the said device has been lowered by a sufficient slack given to the rope 25, the ring 34 will drop and disengage with the hook 33, and when tension is brought to bear upon the rope 25 the releasing device, will be operated, and the movable chamber 5 will be withdrawn from the chamber 1.

In instances where there is a large volume of water within the cistern, it has been found preferable to remove the sediment therefrom without operating the movable chamber 5 in any way, and allowing the air contained in the device to pass from the same while it is submerged in the water contained in the cistern, and in order to accomplish this result I employ the mechanism as I shall now proceed to describe, premising however, that the releasing device above described is in no way disturbed. A hole is cut in the top of the movable chamber 5 and around said hole is secured a collar 35, and placed over said collar and consequently said opening is a movable cap 36, which is adapted to close the opening formed in the said chamber until the device has been lowered and in contact with the sediment contained in the cistern. To the top of the cap 36 is secured a plate 37, the ends of which are provided with openings, and secured to the top of the chamber 5 are two vertical guide-rods 38—which pass through the said openings formed in the plate 37, by which construction the cap on being elevated is guided and held to the remaining portion of the device, and prevented from becoming lost. It has been found necessary in practice to provide means for securing said cap in the position as shown in Fig. 5 when the device is submerged, and thus I employ a lever 39, one end of which is movably secured to the top of the chamber 5, and in close proximity to the cap.

40, represents the horizontal portion of the lever, which is adapted to come in contact with the plate 37 of the cap and hold the said cap in its proper position, and 41, represents a vertical lever by means of which the same is manipulated.

42 represents a vertical rod the lower end of which is secured to the top of the chamber 5, and 43, is a ring which is adapted to pass over the said rod and over the arm 41 of the lever 39, for holding said lever in its proper position until it is desired to allow the cap 36 to be removed from over the opening formed in the chamber 5.

When it is desired to use the device as above described, the branch rope 31 or more properly the lower end of the same is disconnected from the triangular plate 30, and the same secured to the ring 43, which when the device is lowered into the cistern and the operating rope 25 manipulated as before described, the said cap 36 will be allowed to elevate, allowing all air contained in the device to escape, and the water to rush in as the said air escapes, and at the same time withdrawing into the said device all sediment that is near the bottom of the same.

44, represents a binding screw which passes through the horizontal portion 40 of the lever 39, the lower end of which is adapted to bear against the plate 37, in order to insure a water tight connection between the cap and the opening formed in the chamber. The said binding screw is manipulated after the lever has been secured against the cap as shown in Fig. 5 of the drawings.

In order to properly lower the device into the cistern, and hold the same in its proper position, I employ a pole constructed as I shall now proceed to describe.

45 represents a pole which is better illustrated in Fig. 8, and is composed of sections and said sections united by means of metallic couplings 46, premising however the eye bolts 47 are employed for securing the said sections rigidly together and preventing the same from parting. Said pole is square or nearly so, in cross section, the lower section of the same being somewhat differently constructed from the remaining sections for operating the device after the same has been lowered upon the pole. The said lower section 48 is rounded at its lower end as shown at 49 for allowing the said pole to be turned in the lower clip 17 attached to the chamber 1, and above said rounded end is a second rounded portion 50, which also has the same function as the rounded end above described. Above the rounded portion 50 and secured to one side of the pole is an angular projection 51, and secured to the said pole below said rounded portion is a similar projection 52, which is secured to the next side of said pole. The upper end of the pole is provided with a downwardly projecting hook 53, which is adapted to come in contact with the upper edge of the cistern, as better shown in Fig. 1 for supporting the said pole in a rigid position. In placing the device upon the pole, the clips 17 are secured around the latter in such a manner as to bring the slots between the sections of the clips in alignment with the projection 51, and the groove 19 of the lower clip 17 in alignment with the projection 52. When the device is thus attached to the pole, it will be obvious that the clips are free to pass downwardly upon the pole until the closed side of the upper clip strikes the projection 52. In this position the upper and lower clips engage, respectively the rounded portions 50 and 49. The pole is then given a slight turn, thereby locking the upper clip between the projections 51 and 52.

When it is desired to remove the device from the bottom of the cistern the pole 45 is again turned in its former position, allowing the said device to be raised by the rope 25 up the pole where the dirt or sediment contained therein can be removed.

The operation may be continued as many times as necessary in order to remove all the sediment at the bottom of the cistern. When the pole 45 is in the position to allow the device to be elevated, the projection 52 will pass through the groove 19, formed in the lower clip 17.

In some instances it may be desirable to remove the pole with the device, in which case the projection 52 will be brought in contact with the upper clip 17., thereby locking the said pole to said device.

By the use of the hinged portion 20 of the clips, the device can be placed upon and removed from the pole 45 very readily, and is especially desirable where the pole is too long to place the said device over the end of the same.

It will be understood that when the device is employed for removing débris from cisterns containing but little or no water, the telescoping chamber 5 is preferably operated, the air-valve in this instance being closed. But where the cistern contains a large volume of water the air-valve is by preference used, in which event the chambers 1 and 5 are locked together.

I do not wish to limit myself to the precise construction as herein shown and described as the same may be changed without and reduced within without departing from the nature of my invention.

Having fully described my invention, what I claim is—

1. A "device for removing débris from cisterns" consisting of telescoping chambers, a valve carried by the stationary chamber and adapted to be brought in contact with the sediment contained in the cistern, clips secured to the side of the said device, and adapted to embrace a suitable pole upon which the said device is raised and lowered, and a rope or cord attached to the movable chamber for withdrawing the same, substantially as set forth.

2. A "device for removing débris from cisterns" consisting of a stationary chamber such as 1, a chamber 5 adapted to move within the said stationary chamber, an opening formed in the bottom of the said stationary chamber, a valve placed over the said opening, an operating rope such as 25 secured to the movable chamber for operating the same, and a releasing device for allowing the said movable chamber to be released when the said device is properly placed upon the sediment contained in the cistern, substantially as set forth.

3. A "device for removing débris from cisterns" consisting of telescoping chambers, a valve such as 4 placed in the lower end or bottom of the stationary chamber, a collar such as 6 encircling the movable chamber,—rubber or other packing such as 8 interposed between said collar and collar 7, suitable locking devices for securing said collars to said stationary chamber, staples secured to the top of the movable chamber, a spring arm such as 27 secured to the collar 7, the upper end of which is adapted to come in engagement with one of the staples, a plate 29 encircling one of the guide rods, and also adapted to engage the upper end of the said spring arm, a triangular shaped plate such as 30 adapted to be interposed between the said plate and the said staple, an operating rope such as 25 secured to the top of the said movable chamber and having a suitable branch the end of which is adapted to be attached to the said triangular shaped plate for disengaging the movable chamber, substantially as set forth.

4. A "device for removing débris from cisterns" consisting of telescoping chambers, a valve such as 4 placed in the bottom of the stationary chamber, an opening formed in the top of the movable chamber, a cap such as 36 adapted to cover the said opening, a lever such as 39 adapted to be brought in contact with the top of the said cap, a rod such as 42 secured to the top of the said chamber 5, a ring such as 43 adapted to be passed over said lever and rod, an operating rope such as 25 secured to the top of the said movable chamber and provided with a branch 31, the end of which is adapted to be attached to the said ring 22 for releasing the cap and allowing the air to escape that is contained within the device, substantially as set forth.

5. A "device for removing débris from cisterns" consisting of telescoping chambers, one of which is provided with a suitable valve for allowing the sediment to pass into said chambers, clips secured to the said chambers, a pole such as 45 provided with rounded portions such 49 and 50 for allowing the said pole to be turned within the said clip projections such as 51 and 52 secured to the said pole and adapted to be brought in contact with the upper one of said clips for depressing the said chambers upon the sediment contained in the cistern, and an operating rope such as 25 secured to the top of the movable chamber 5 for raising and lowering the said device upon the said pole, substantially as set forth.

6. A "device for removing débris from cisterns" having telescoping chambers, clips secured to the same, a pole such as 45 adapted to be embraced by the said clips, an operating rope such as 25 secured to the movable chamber for raising and lowering the said device upon said pole, substantially as set forth.

In testimony whereof I affix my signature in presence of two witnesses.

GEORGE D. WILSON.

Witnesses:
EWD. E. LONGAN,
JNO. C. HIGDON.